United States Patent
Gao et al.

(10) Patent No.: US 12,112,088 B2
(45) Date of Patent: Oct. 8, 2024

(54) MULTI-TERMINAL SCREEN COMBINATION METHOD, DEVICE, AND COMPUTER STORAGE MEDIUM

(71) Applicant: SHENZHEN TCL NEW TECHNOLOGY CO., LTD., Guangdong (CN)

(72) Inventors: Si Gao, Guangdong (CN); Yunhua Wang, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/044,572

(22) PCT Filed: Aug. 16, 2021

(86) PCT No.: PCT/CN2021/112678
§ 371 (c)(1),
(2) Date: Mar. 8, 2023

(87) PCT Pub. No.: WO2022/052742
PCT Pub. Date: Mar. 17, 2022

(65) Prior Publication Data
US 2023/0333798 A1    Oct. 19, 2023

(30) Foreign Application Priority Data
Sep. 9, 2020 (CN) .......................... 202010945203.3

(51) Int. Cl.
*G06F 3/14* (2006.01)
*G06T 3/4092* (2024.01)
*G06T 7/11* (2017.01)

(52) U.S. Cl.
CPC .......... *G06F 3/1446* (2013.01); *G06T 3/4092* (2013.01); *G06T 7/11* (2017.01)

(58) Field of Classification Search
CPC ........ G06F 3/1446; G06T 7/11; G06T 3/4092
See application file for complete search history.

(56) References Cited

U.S. PATENT DOCUMENTS

2016/0291919 A1* 10/2016 Kurota ................. H04N 9/3147
2019/0034150 A1*  1/2019 Vigna ................... G06F 3/1423
(Continued)

FOREIGN PATENT DOCUMENTS

CN    102222493 A    10/2011
CN    103377025 A    10/2013
(Continued)

OTHER PUBLICATIONS

International Search Report in International application No. PCT/CN2021/112678, mailed on Nov. 17, 2021.
(Continued)

*Primary Examiner* — Liliana Cerullo
(74) *Attorney, Agent, or Firm* — PV IP PC; Wei Te Chung (57) ABSTRACT

A multi-terminal screen combination method, device, and a computer storage medium. The method comprises the steps of: obtaining screen sizes of a reference terminal and a target terminal (S10); dividing, according to the screen dimensions, a picture to be displayed to generate display sub-pictures (S20); and displaying the display sub-picture corresponding to the reference terminal, and sending the other display sub-picture to the target terminal for display (S30). A function of combined display by means of a plurality of terminals is implemented.

8 Claims, 3 Drawing Sheets

(56) References Cited

U.S. PATENT DOCUMENTS

2019/0371280 A1* 12/2019 Taki ........................ G06F 3/01
2022/0019398 A1* 1/2022 Cao ...................... G06F 3/1446
2023/0305789 A1* 9/2023 Xu ....................... G06F 1/1626

FOREIGN PATENT DOCUMENTS

| CN | 104375798 A | 2/2015 |
| CN | 104536714 A | 4/2015 |
| CN | 104657101 A | 5/2015 |
| CN | 106293571 A | 1/2017 |
| CN | 106775532 A | 5/2017 |
| CN | 111163206 A | 5/2020 |
| CN | 112328193 A | 2/2021 |

OTHER PUBLICATIONS

Written Opinion of the International Search Authority in International application No. PCT/CN2021/112678, mailed on Nov. 17, 2021.

* cited by examiner

MULTI-TERMINAL SCREEN COMBINATION METHOD, DEVICE, AND COMPUTER STORAGE MEDIUM

CROSS-REFERENCE TO RELATED APPLICATION

This application is a national phase application of PCT Application No. PCT/CN2021/112678 filed Aug. 16, 2021, which claims priority to Chinese Application No. 202010945203.3 filed Sep. 9, 2020 and entitle with "MULTI-TERMINAL SCREEN COMBINATION METHOD, APPARATUS AND DEVICE, AND COMPUTER STORAGE MEDIUM", the contents of which are incorporated herein by reference in their entirety.

TECHNICAL FIELD

The present application relates to a field of communication technology, and in particular, to a multi-terminal screen combination method, device, and a computer storage medium.

BACKGROUND

With development of mobile communication technology, use of smart devices such as mobile phones and tablets is becoming more and more popular. Generally, a user will have a plurality of smart devices, but due to a screen size of a single smart device, it is not convenient for the user to view some special images and texts on the smart device, and an impression is also poor. If content displayed on one smart device can be displayed after combining a plurality of devices, a better impression will be obtained.

SUMMARY

Technical Problems

In the related art, a point-to-point screen projection scheme between two devices is relatively mature, but it is impossible to realize that content on one smart device can be displayed after combining a plurality of devices.

SOLUTIONS FOR PROBLEMS

Technical Solutions

A main purpose of the present application is to provide a multi-terminal screen combination method, device, and a computer storage medium, aiming to solve a technical problem that a plurality of smart devices cannot be combined for display together.

In order to achieve the above-mentioned objective, a multi-terminal screen combination method is provided in the present application, and the multi-terminal screen combination method comprises following steps:

In an embodiment, the multi-terminal screen combination method is applied to a reference terminal, and the multi-terminal screen combination method comprises following steps:
  obtaining a screen size of the reference terminal and a screen size of a target terminal;
  dividing a picture to be displayed, according to the screen size of the reference terminal and the screen size the target terminal, to generate a display sub-picture corresponding to the reference terminal and a display sub-picture corresponding to the target terminal; and
  displaying the display sub-picture corresponding to the reference terminal, and sending the display sub-picture corresponding to the target terminal to the target terminal for display.

In an embodiment, the step of obtaining the screen sizes of the reference terminal and the target terminal comprises:
  detecting one or more candidate terminals in a network where the reference terminal is located;
  sending a test instruction to each of the one or more candidate terminals, and determining, as the target terminal, one of the one or more candidate terminals that returns confirmation information in response to the test instruction; and
  obtaining the screen size of the reference terminal and the screen size of the determined target terminal.

In an embodiment, the step of dividing the picture to be displayed according to the screen sizes of the reference terminal and the target terminal, and generating the display sub-picture corresponding to the reference terminal and the display sub-picture corresponding to the target terminal comprises:
  dividing the picture to be displayed, according to the screen size of the reference terminal and the screen size of the target terminal, to generate a sub-picture corresponding to the reference terminal and a sub-picture corresponding to the target terminal;
  obtaining resolution of the reference terminal and resolution of the target terminal; and
  processing the sub-picture corresponding to the reference terminal, according to the resolution of the reference terminal, to generate the display sub-picture corresponding to the reference terminal, and processing the sub-picture corresponding to the target terminal, according to the resolution of the target terminal, to generate the display sub-picture corresponding to the target terminal.

In an embodiment, the step of processing the sub-picture corresponding to the reference terminal according to the resolution of the reference terminal, and generating the display sub-picture corresponding to the reference terminal; and processing the sub-picture corresponding to the target terminal according to the resolution of the target terminal, and generating the display sub-picture corresponding to the target terminal comprises:
  obtaining resolution of the sub-picture corresponding to the reference terminal and resolution of the sub-picture corresponding to the target terminal, and determining a relationship between the resolution of the sub-picture corresponding to the reference terminal and the resolution of the reference terminal and a relationship between the resolution of the sub-picture corresponding to the target terminal and the resolution of the target terminal;
  interpolating the sub-picture corresponding to the reference terminal to generate the display sub-picture corresponding to the reference terminal if the resolution of the sub-picture corresponding to the reference terminal is less than the resolution of the reference terminal, and interpolating the sub-picture corresponding to the target terminal to generate the display sub-picture corresponding to the target terminal if the resolution of the sub-picture corresponding to the target terminal is less than the resolution of the target terminal;
  compressing the sub-picture corresponding to the reference terminal to generate the display sub-picture corresponding to the reference terminal if the resolution of the sub-picture corresponding to the reference terminal is greater than the resolution of the reference terminal, and compressing the sub-picture corresponding to the target terminal to generate the display sub-picture corresponding to the target terminal if the resolution of the sub-picture corresponding to the target terminal is greater than the resolution of the target terminal; and taking the sub-picture corresponding to the reference terminal directly as the display sub-picture corresponding to the reference terminal if the resolution of the sub-picture corresponding to the reference terminal is equal to the resolution of the reference terminal, and taking the sub-picture corresponding to the target terminal directly as the display sub-picture corresponding to the target terminal if the resolution of the sub-picture corresponding to the target terminal is equal to the resolution of the target terminal.

In an embodiment, after displaying the display sub-picture corresponding to the reference terminal, and sending the display sub-picture corresponding to the target terminal to the target terminal for display, the multi-terminal screen combination method further comprises:

upon receiving a display parameter adjustment instruction, adjusting a display parameter of the reference terminal based on the display parameter adjustment instruction, and forwarding the display parameter adjustment instruction to the target terminal, to enable the target terminal to perform display parameter adjustment based on the display parameter adjustment instruction synchronously with the reference terminal.

In an embodiment, after the step of upon receiving the display parameter adjustment instruction, adjusting the display parameters of the reference terminal based on the display parameter adjustment instruction, and forwarding the display parameter adjustment instruction to the target terminal to make the target terminal adjust the display parameters synchronized with the reference terminal based on the display parameter adjustment instruction, the multi-terminal screen combination method further comprises:

upon detecting that the target terminal has received the display parameter adjustment instruction, obtaining the display parameter adjustment instruction and adjusting the display parameter of the reference terminal based on the display parameter adjustment instruction; and forwarding the display parameter adjustment instruction to another target terminal, to enable the another target terminal to perform display parameter adjustment based on the display parameter adjustment instruction synchronously with the target terminal.

In an embodiment, after displaying the display sub-picture corresponding to the reference terminal, and sending the other display sub-picture to the corresponding target terminal for display, the multi-terminal screen combination method comprises:

upon receiving a notification message or detecting that the target terminal has received the notification message, determining whether the notification message is a private message; and simplifying the notification message for display if the notification message is the private message.

In an embodiment, the step of dividing the picture to be displayed according to the screen sizes of the reference terminal and the target terminal, and generating the sub-pictures corresponding to the reference terminal and the target terminal comprises:

an obtaining module used to obtain screen sizes of the reference terminal and a target terminal determining whether the screen size of the reference terminal is same as the screen size of the target terminal; and equally dividing the picture to be displayed if the screen size of the reference terminal is same as the screen size of the target terminal, and generating the sub-pictures corresponding to the reference terminal and the target terminal.

In an embodiment, the step of sending the test instruction to the candidate terminal, and determining the candidate terminal that returns the confirmation information based on the test instruction as the target terminal comprises:

ending the test instruction to the candidate terminal to display a confirmation interface in the candidate terminal, and determining the candidate terminal that returns the confirmation information after receiving a confirmation instruction input by a user as the target terminal.

In addition, in order to realize the above-mentioned objective, a multi-terminal screen combination device is further provided in the present application;

the multi-terminal screen combination device comprises: a memory, a processor, and a computer program stored on the memory and capable of running on the processor, wherein when the computer program is executed by the processor, the steps of the above-mentioned multi-terminal screen combination method are realized.

In addition, in order to realize the above-mentioned objective, a computer storage medium is further provided;

the computer storage medium stores a computer program, and when the computer program is executed by the processor, the steps of the above-mentioned multi-terminal screen combination method are realized.

Beneficial Effects

A multi-terminal screen combination method, device, and a computer storage medium are provided in the embodiments of the present application. Screen sizes of the reference terminal and a target terminal are obtained; a picture to be displayed is divided according to the screen sizes of the reference terminal and the target terminal to generate a display sub-picture corresponding to the reference terminal and a display sub-picture corresponding to the target terminal; the display sub-picture corresponding to the reference terminal is displayed, and other display sub-picture is sent to the corresponding target terminal for display. Taking a terminal as the reference, the target terminal that can perform screen combination under a same network is searched, and the screen size of the target terminal is obtained. According to the screen size, a terminal screen is divided into sub-pictures corresponding to the reference terminal and the target terminal. According to resolution of the corresponding reference terminal or target terminal, the sub-picture is directly displayed on the reference terminal or sent to the target terminal for display, thereby realizing combined display by means of a plurality of terminals.

Achievement of the objective, functional features, and advantages of embodiments of the present application will be further described with reference to accompanying drawings.

Detailed Description of Embodiments

It should be understood that specific embodiments described here are only used to explain the present application, not to limit the present application.

Since a plurality of smart devices cannot be combined for [same] display in prior art, the present application provides a solution, screen sizes of the reference terminal and a target terminal are obtained; a picture to be displayed is divided according to the screen sizes of the reference terminal and the target terminal to generate a display sub-picture corresponding to the reference terminal and a display sub-picture corresponding to the target terminal; the display sub-picture corresponding to the reference terminal is displayed, and other display sub-picture is sent to the corresponding target terminal for display. Taking a terminal as the reference, the target terminal that can perform screen combination under a same network is searched, and the screen size of the target terminal is obtained. According to the screen size, a terminal screen is divided into sub-pictures corresponding to the reference terminal and the target terminal. According to resolution of the corresponding reference terminal or target terminal, it is directly displayed on the reference terminal and sent to the target terminal for display, which realizes combined display of a plurality of terminals.

Figure 1:
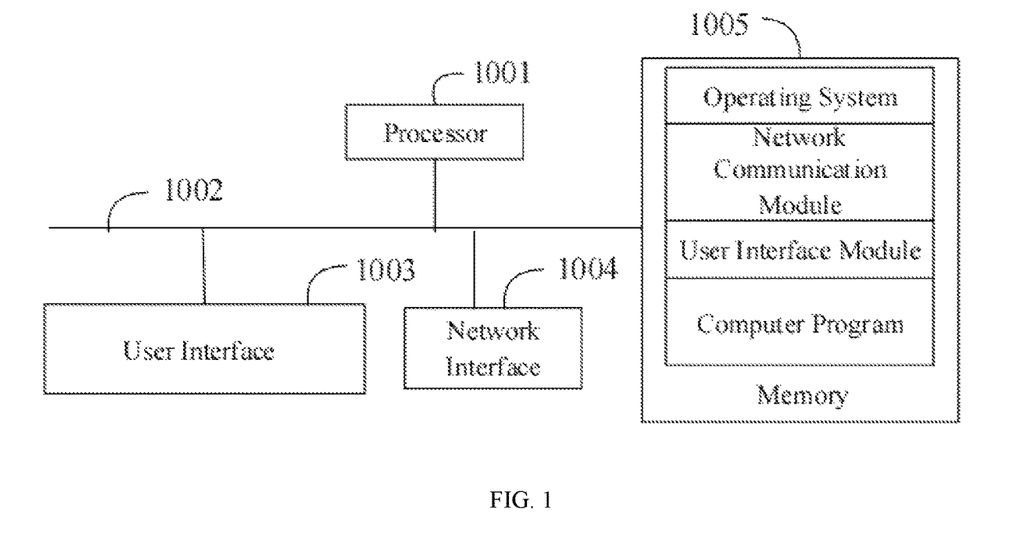
FIG. 1 is a schematic structural diagram of devices in hardware operation environment where embodiments of the present application are applicable.

FIG. 1 is a schematic structural diagram of a terminal (it is also called multi-terminal screen combination device, wherein, the multi-terminal screen combination device can be composed of a single multi-terminal screen combination apparatus, or it can be composed of other apparatuses and a multi-terminal screen combination device) of hardware operation environment involved in an embodiment of the present application.

The terminal in the embodiments of the present application may be a fixed terminal or a mobile terminal, such as a smart air conditioner, a smart light, a smart power supply, a smart speaker, an autonomous vehicle, a personal computer (PC), a smart phone, a tablet computer, an e-book reader, a portable computer, etc. which are equipped with a networking function.

As shown in FIG. 1, the terminal may include: a processor 1001, such as a central processing unit (CPU), a network interface 1004, a user interface 1003, a memory 1005, and a communication bus 1002. Wherein, the communication bus 1002 is used to realize connection communication between these components. The user interface 1003 can include a display, an input unit such as a keyboard. Optionally, the user interface 1003 can also include a standard wired interface and a standard wireless interface. The network interface 1004 can optionally include a standard wired interface and a standard wireless interface (such as wireless fidelity, WIFI interface). The memory 1005 may be a high-speed random access memory (RAM) memory or a non-volatile memory, for example, a disk memory. The memory 1005 can also be a storage device independent of the processor 1001.

Optionally, the terminal can also include a camera, a radio frequency (RF) circuit, a sensor, an audio circuit, a WIFI module, the input unit, such as a display, a touch screen, and the network interface which can optionally be a Bluetooth, a probe, etc. except WIFI in the wireless interface. Wherein, the sensor includes an optical sensor, a motion sensor, or other sensors. Specifically, the optical sensor can include an ambient light sensor and a proximity sensor. As it should be, the mobile terminal can also be configured with other sensors such as a gyroscope, a barometer, a hygrometer, a thermometer, or an infrared sensor, which will not be repeated here.

It can be understood by those skilled in the art that the terminal structure shown in FIG. 1 does not limit the terminal, and can include more or fewer components than shown in the figure, or combination of some components, or different component arrangements.

As shown in FIG. 1, a computer program product stores on a computer storage medium (the computer storage medium is also called a computer storage medium, a computer medium, a readable medium, a readable computer storage medium, a computer readable computer storage medium, or directly called a medium; the computer storage media may be a non-volatile readable computer storage medium such as a RAM, a magnetic disk, or an optical disk), which includes several instructions to enable a terminal device (which may be a mobile phone, a computer, a server, an air conditioner, or a network device, etc.) to execute methods described in the various embodiments of the present application. The memory 1005 as a computer storage medium can include an operating system, a network communication module, a user interface module, and a computer program.

In the terminal shown in FIG. 1, the network interface 1004 is mainly used to connect a backend server and perform data communication with the backend server. The user interface 1003 is mainly used to connect a client (user) end and perform data communication with the client end. The processor 1001 can be used to invoke the computer program stored on the memory 1005 and execute steps in a multi-terminal screen combination method provided by following embodiments of the present application.

Figure 2:
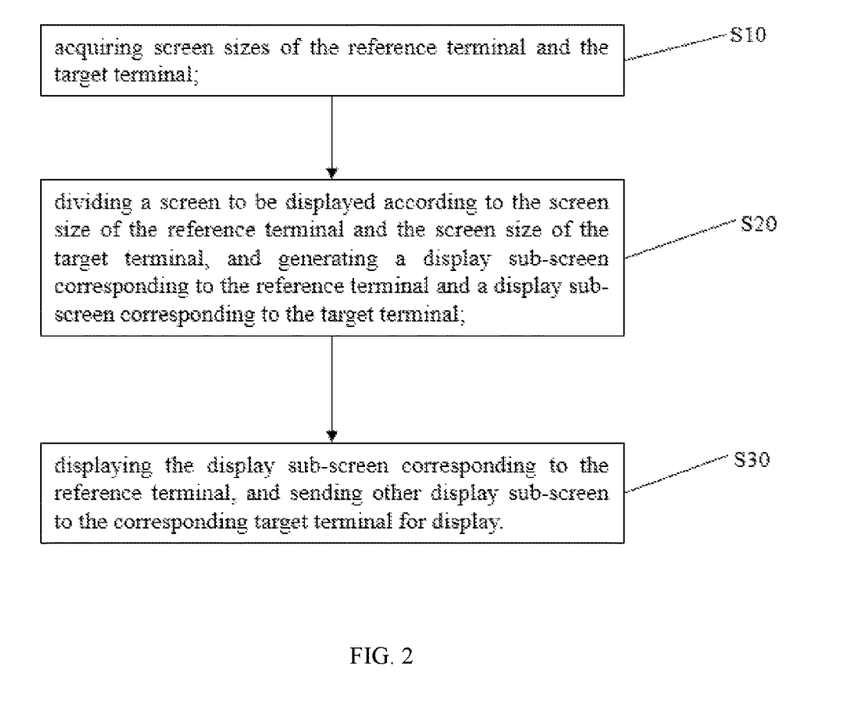
FIG. 2 is a schematic flowchart of a multi-terminal screen combination method according to a first embodiment of the present application.

Referring to FIG. 2, in a first embodiment of a multi-terminal screen combination method of the present application, the multi-terminal screen combination method includes:

step S10: obtaining screen sizes of the reference terminal and the target terminal.

The methods of this embodiment and subsequent embodiments are implemented at the reference terminal, and the reference terminal obtains the screen sizes of the reference terminal itself and the target terminal in a same network. The reference terminal and the target terminal can be terminals such as mobile phones, personal digital assistants (PDAs), game consoles, or smart TVs etc.; while the reference terminal and the target terminal can be a same type of products or different types of products. In order to realize a objective of display of combination of different terminals, a number of the target terminals is at least one, and the reference terminal can be understood as basis for the display of combination of different terminals. Combined display content is content displayed by the reference terminal. After the combined display, the reference terminal still participates in the combined display, and also acts as a data source. The content includes but is not limited to pictures, videos, game pictures, etc. It can be understood that, the screen size is an inherent parameter of each terminal, which can be read between different terminals under the same network.

Furthermore, before the step S10, the multi-terminal screen combination method can include:

step a1: determining a candidate terminal in the same network.

Step a2: sending a test instruction to the candidate terminal.

Step a3: obtaining the screen sizes of the reference terminal and the target terminal that returns confirmation information based on the test instruction.

The reference terminal detects the candidate terminal under the same network as the reference terminal, and the candidate terminal is a terminal that the reference terminal can directly detect and capture. It can be understood that the candidate terminals may not all be smart devices with screens, but may also be terminals such as smart temperature and humidity meters and smart door locks connected to a unified network, and may also be terminals connected to the same network but in a dormant state. To screen out the above-mentioned special terminals, the reference terminal sends the test instruction to the candidate terminal, and the test instruction is an instruction to determine whether the candidate terminal is in the dormant state. The reference terminal obtains the screen sizes of the reference terminal itself and the target terminal that returns the confirmation information based on the test instruction. When the candidate terminal returns the confirmation information upon receiving the test instruction, the candidate terminal is regarded as the target terminal that can be further combined, so as to further obtain the screen size and resolution parameters of the target terminal.

Specifically, because it is not necessary to make candidate terminals with combination conditions in the same network environment become subsequent target terminals, the test instruction can also be sent to the candidate terminal from the reference terminal, so as to display a confirmation interface in the candidate terminal. After receiving a confirmation instruction input by the user, the candidate terminal returns the confirmation information to the reference terminal, and then the candidate terminal becomes the target terminal.

Step S20: dividing a picture to be displayed according to the screen size of the reference terminal and the screen size of the target terminal, and generating a display sub-picture corresponding to the reference terminal and a display sub-picture corresponding to the target terminal.

The reference terminal divides the display picture according to the screen size of the reference terminal itself and the screen size of the target terminal, so as to generate sub-pictures corresponding to the reference terminal and the target terminal. As described in the previous step, the reference terminal serves as the data source of the combined display content, and also participates in the combined display, therefore, screen size parameters of the reference terminal and the target terminal will affect the division of the display content (i.e. the picture to be displayed); and the screen size of the reference terminal itself is also a guiding factor for screen division, the display picture is a screen displayed by the terminal in real time. This embodiment provides a specific implementation method for dividing the picture to be displayed according to the screen sizes of the reference terminal and the target terminal, that is, the step of dividing the picture to be displayed according to the screen size of the reference terminal and the screen size of the target terminal, and generating the display sub-picture corresponding to the reference terminal and the display sub-picture corresponding to the target terminal can include:

step b1: dividing the picture to be displayed according to the screen size of the reference terminal and the screen size of the target terminal, and generating the sub-pictures corresponding to the reference terminal and the target terminal.

The reference terminal divides the picture to be displayed according to the screen size of the reference terminal and the screen size of the target terminal, so as to generate the sub-pictures corresponding to the reference terminal and the target terminal.

Specifically, the step of dividing the picture to be displayed according to the screen size of the reference terminal and the target terminal, and generating the sub-pictures corresponding to the reference terminal and the target terminal includes:

step b11: determining whether the screen size of the reference terminal is same as the screen size of the target terminal.

The reference terminal determines whether the screen size of the reference terminal itself is same as the screen size of the target terminal. It can be understood that when the screen size of the reference terminal is same as or different from the screen size of the target terminal, there will be significant differences in a real-time screen dividing strategy.

Step b12: equally dividing the picture to be displayed if the screen size of the reference terminal is same as the screen size of the target terminal, and generating the sub-pictures corresponding to the reference terminal and the target terminal.

Figure 3:
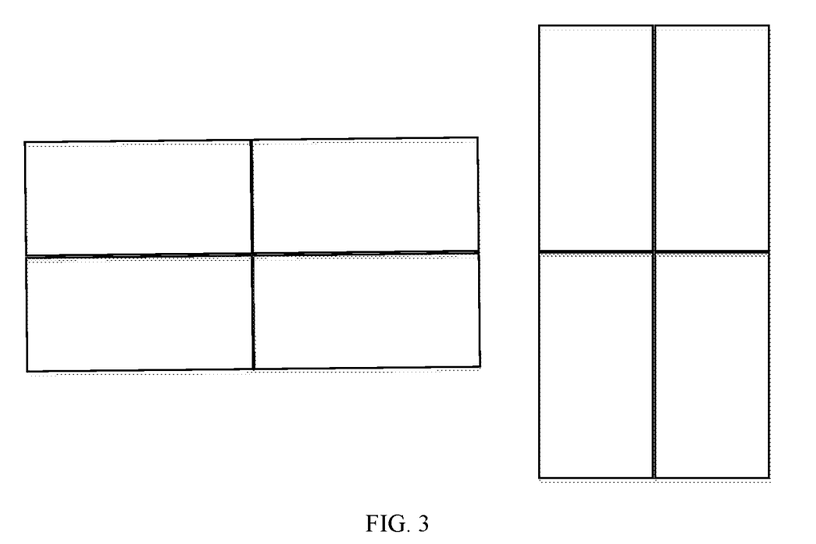
FIG. 3 is a first schematic diagram of division of a display picture in the multi-terminal screen combination method according to the first embodiment of the present application.
Figure 4:
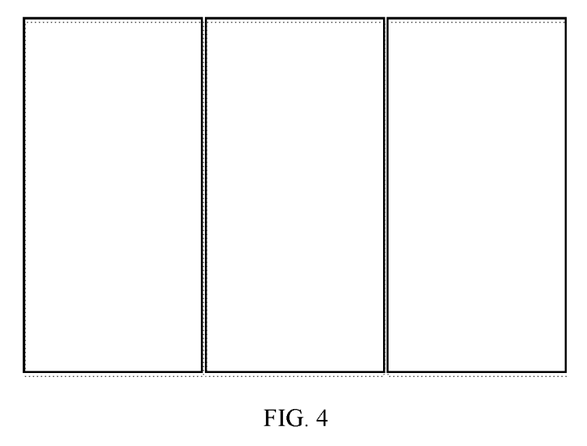
FIG. 4 is a second schematic diagram of division of a display picture in the multi-terminal screen combination method according to the first embodiment of the present application.

If the screen size of the reference terminal is same as the screen size of the target terminal, the reference terminal equally divides the picture to be displayed, so as to generate the sub-pictures corresponding to the reference terminal and the target terminal. The equally dividing method can be selected by the user, as shown in FIG. 3. When a total number of the reference terminal and target terminals is 4, the user can select a shape of "tian" dividing method, such as horizontal or vertical equally dividing. A number of equally dividing parts depends on the number of the reference terminal and target terminals. Of course, the equally dividing method can also be selected by the reference terminal from preset options, as shown in FIG. 4. The generated sub-pictures are in one-to-one correspondence with the reference terminal or target terminal.

Step b13: dividing the picture to be displayed according to preset rules if the screen size of the reference terminal is same as the screen size of the target terminal, and generating sub-pictures corresponding to the reference terminal [, the terminal,]] and the target terminal.

Figure 5:
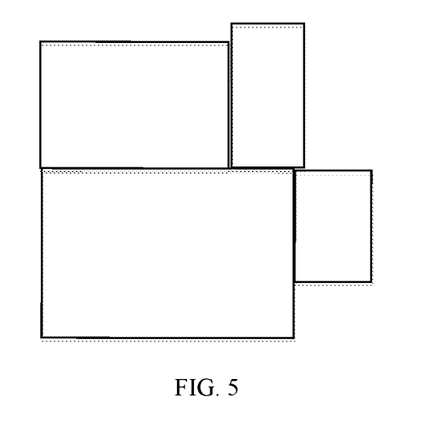
FIG. 5 is a third schematic diagram of division of a display picture in the multi-terminal screen combination method according to the first embodiment of the present application.

Step b13: dividing the picture to be displayed according to preset rules if the screen size of the reference terminal is same as the screen size of the target terminal, and generating sub-pictures corresponding to the reference terminal, the terminal, and the target terminal. The preset rules include combining modes of each terminal and dividing modes of the picture to be displayed. The combination modes are diverse, as shown in FIG. 5. The reference terminal or target terminal with a greatest screen size is used as a combination basis, and other terminals are arranged clockwise around a frame of the combined reference terminal to form a virtual screen. The virtual screen is a regular rectangle or an irregular polygon, and the terminal divides the picture to be displayed according to a screen proportion at a composition position of the terminal or target terminal on the virtual screen to generate a plurality of sub-pictures. The generated sub-pictures are in one-to-one correspondence with the reference terminal or target terminal.

Step b2: obtaining resolution of the reference terminal and resolution of the target terminal.

The reference terminal obtains the resolution of the reference terminal and the resolution of the target terminal. The resolution is an inherent parameter of each terminal, which can be read between different terminals under the same network. The specific implementation method of obtaining the target terminals by the reference terminal has been described in the previous steps, and will not be repeated here.

Step b3: processing the sub-picture corresponding to the reference terminal according to the resolution of the reference terminal, and generating the display sub-picture corresponding to the reference terminal; processing the sub-picture corresponding to the target terminal according to the resolution of the target terminal, and generating the display sub-picture corresponding to the target terminal.

The reference terminal processes the sub-picture corresponding to the reference terminal according to the resolution of the reference terminal, so as to generate the display sub-picture corresponding to the reference terminal; the reference terminal processes the sub-picture corresponding to the target terminal according to the resolution of the target terminal, so as to generate the display sub-picture corresponding to the target terminal. It can be understood that different terminals may have different resolution even if they have same screen sizes. If the resolution of the sub-picture is greater than the resolution of the target terminal, the sub-picture will not be fully displayed on the target terminal. If the resolution of the sub-picture is less than the resolution of the target terminal, the sub-picture will occupy only a small display area in the target terminal. When screen combination is actually performed, the above-mentioned problems will affect a combination effect. Therefore, when the display picture is divided into sub-pictures, the sub-pictures need to be processed according to the resolution of the reference terminal or the resolution of the target terminal.

The step of processing the sub-pictures according to the resolution of the reference terminal or the resolution of the target terminal, and generating the display sub-pictures can specifically include:

step c1: obtaining resolution of the sub-pictures corresponding to the reference terminal and the target terminal, and determining a relationship between the resolution of the sub-pictures and the resolution of the corresponding reference terminal or the corresponding target terminal.

The reference terminal obtains the resolution of the sub-pictures corresponding to the reference terminal and the target terminal, and determines the relationship between the resolution of the sub-pictures and the resolution of the reference terminal or the target terminal. It can be understood that according to the dividing method in the preceding steps, when the screen size of each terminal is same, the resolution of the sub-pictures has a proportional relationship with the display picture. For example, the resolution of the sub-pictures is 1/2, 1/3 of the display picture, depending on the total number of the reference terminal and the target terminals, otherwise, it needs to be determined according to the specific dividing method. To determine the relationship between the resolution of the sub-pictures and the resolution of the corresponding reference terminal or target terminal is to determine whether the resolution of the sub-pictures is greater or less than the resolution of the reference terminal or target terminal.

Step c2: interpolating the sub-picture and generating the display sub-picture if the resolution of the sub-picture is less than the resolution of the corresponding reference terminal or the target terminal.

If the resolution of the sub-picture is less than the resolution of the corresponding reference terminal or the target terminal, the sub-picture is interpolated to generate the display sub-picture. When the resolution of the sub-picture is less than the resolution of the reference terminal or the target terminal, the sub-picture only occupies a part of the display area in the reference terminal or the target terminal. Therefore, it is necessary to expand the sub-picture. An expansion method is to interpolate the sub-picture. An interpolating scheme can be one or more combinations of a pixel interpolation algorithm, a bilinear interpolation algorithm, a bicubic interpolation algorithm, or a fractal algorithm. After processing, the display sub-picture corresponding to the terminal or target terminal is generated.

Step c3: compressing the sub-picture and generating the display sub-picture if the resolution of the sub-picture is greater than the resolution of the corresponding reference terminal or the corresponding target terminal.

Step c4: directly taking the sub-picture as the display sub-picture if the resolution of the sub-picture is equal to the resolution of the corresponding reference terminal or the corresponding target terminal.

If the resolution of the sub-picture is greater than the resolution of the corresponding reference terminal or the corresponding target terminal, the reference terminal compresses the sub-picture to generate the display sub-picture. When the resolution of the sub-picture is greater than the resolution of the corresponding reference terminal or the corresponding target terminal, the sub-picture is not fully displayed in the reference terminal or the target terminal, so it is necessary to reduce the sub-picture. One or more of a chromaticity sampling algorithm, a transform coding algorithm, or a fractal compression algorithm are combined to generate the display sub-picture corresponding to the reference terminal or target terminal after processing. If the resolution of the sub-picture is equal to the resolution of the corresponding reference terminal or the corresponding target terminal, the reference terminal directly takes the sub-picture as the display sub-picture.

Step S30: displaying the display sub-picture corresponding to the reference terminal, and sending other display sub-picture to the corresponding target terminal for display.

The reference terminal displays the display sub-picture corresponding to the reference terminal, and sends other display sub-picture to the corresponding target terminal for display.

The step of displaying the display sub-picture corresponding to the reference terminal, and sending other display sub-picture to the corresponding target terminal for display specifically includes following steps:

In the embodiment, by taking a terminal as the reference terminal, the target terminal that can perform screen combination under the same network is searched and the screen size of the target terminal is obtained. A screen of the terminal is divided into the sub-pictures corresponding to the reference terminal and the target terminal respectively according to the screen size; and after processing according to the resolution of the corresponding reference terminal or the corresponding target terminal, it is directly displayed on the reference terminal and sent to the target terminal for display, realizing a combined display function of a plurality of terminals, making full use of the user's smart terminal to bring better experience to the user.

Furthermore, on the basis of the first embodiment of the present application, a second embodiment of the multi-terminal screen combination method in the present application is provided. This embodiment is the post step of step S30 in the first embodiment. The multi-terminal screen combination method includes:

step d1: when receiving a display parameter adjustment instruction, adjusting display parameters of the reference terminal based on the display parameter adjustment instruction, and forwarding the display parameter adjustment instruction to the target terminal to make the target terminal adjust display parameters synchronized with the reference terminal based on the display parameter adjustment instruction.

When receiving the display parameter adjustment instruction, the reference terminal forwards the display parameter adjustment instruction to the target terminal for synchronous adjustment. The display parameter adjustment instruction includes the display parameter adjustment instruction of brightness adjustment, volume adjustment, and other parameters. This embodiment takes the brightness adjustment as an example. When the terminal receives the brightness display parameter adjustment instruction, such as the brightness increases by 10%, in order to achieve a unified display effect for each terminal, the terminal forwards the brightness display parameter adjustment instruction to the target terminal, so that the target terminal can adjust the brightness synchronously. Specifically, after the step S10 of the first embodiment, a step can be added: the reference terminal sends its own parameter settings to the target terminal, so that the target terminal can be adjusted synchronously to achieve the best impression.

In addition, the step d1 can be replaced by following steps:

d2: when detecting that the target terminal has received the display parameter adjustment instruction, obtaining the display parameter adjustment instruction and adjusting the display parameters of the reference terminal based on the display parameter adjustment instruction.

d3: forwarding the display parameter adjusting instruction to other target terminals to make the other target terminals adjust display parameters synchronized with the target terminal based on the display parameter adjusting instruction.

When it is detected that the target terminal has received the display parameter adjustment instruction, the display parameter adjustment instruction is obtained for corresponding adjustment, and the display parameter adjustment instruction is forwarded to the other target terminals for synchronous adjustment.

When the reference terminal detects that the target terminal has received the display parameter adjustment instruction, the display parameter adjustment instruction is obtained for corresponding adjustment, and the display parameter adjustment instruction is forwarded to the other target terminals for synchronous adjustment. The steps d2 and d3 can be implemented in combination with step d1 or be implemented independently.

In the embodiment, by forwarding the display parameter adjustment instruction received by any terminal in the screen combination terminal to other terminals, synchronous adjustment of display parameters of each terminal is realized. When screen combination is performed, the display parameters or other parameters of each terminal are unified to achieve a better combined impression.

Furthermore, on the basis of the above embodiments of the present application, a third embodiment of the multi-terminal screen combination method of the present application is further provided. The embodiment is a post step of step S30 in the first embodiment, and the multi-terminal screen combination method includes:

step e1: when receiving a notification message or detecting that the target terminal has received a notification message, determining whether the notification message is a private message.

Step e2: simplifying the notification message to display if the notification message is the private message.

When the reference terminal receives the notification message or detects that the target terminal has received the notification message, it determines whether the notification message is the private message. A method of determining whether the notification message is the private message is to determine whether an application program is in a preset program list by obtaining the application program that sends the notification message. The program list can be set by users themselves or by system default. The system default settings usually include an instant chat software, a payment software, and other privacy and security oriented devices. If the notification message is the private message, the notification message is simplified to display. The simplifying method can only display an icon of the application that sends the notification message. A default display mode of this embodiment is to display on the reference terminal. At this time, in order to inform the user which terminal receives the notification message, a pre-obtained terminal name can be added to the displayed notification message. In addition, the notification can be simplified and displayed only on the terminal receiving the notification message or synchronously displayed on the terminal combining the screens.

In the embodiment, by determining whether the notification message received by the terminal or the target terminal is the private message when the screen is combined, and simplifying for display when the notification message is the private message, the user privacy is protected when screens of a plurality of terminals are combined.

Figure 6:
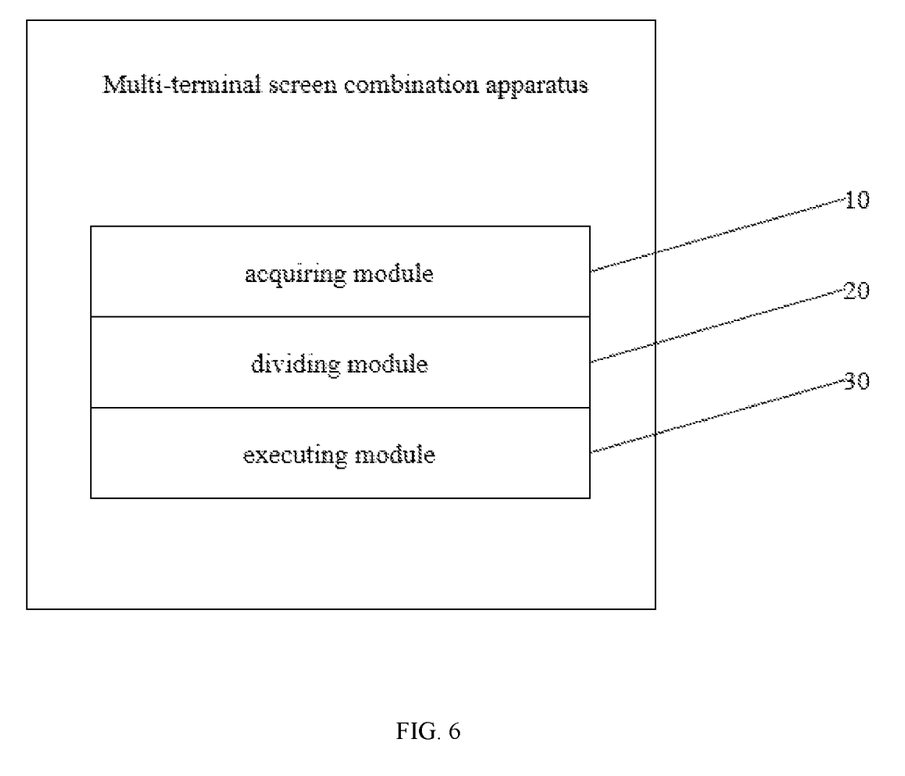
FIG. 6 is a schematic diagram of a multi-terminal screen combination apparatus of the present application.

In addition, a multi-terminal screen combination apparatus is provided in an embodiment of the present application, as shown in FIG. 6. The multi-terminal screen combination apparatus includes:

an obtaining module used for obtaining screen sizes of a reference terminal and a target terminal;

a dividing module used for dividing a picture to be displayed according to the screen sizes of the reference terminal and the target terminal, and generating a display sub-picture corresponding to the reference terminal and a display sub-picture corresponding to the target terminal;

an executing module used for displaying the display sub-picture corresponding to the reference terminal and sending other display sub-picture to the corresponding target terminal for display.

wherein, the steps to realize each functional module of the multi-terminal screen combination apparatus can refer to each embodiment of the multi-terminal screen combination method of the present application, and will not be repeated here.

In addition, in order to realize the above-mentioned objective, a multi-terminal screen combination device is further provided in a present application.

The multi-terminal screen combination device includes: a memory, a processor, and a computer program stored on the memory and capable of running on the processor, wherein:

when the computer program is executed by the processor, the operation in the multi-terminal screen combination method provided by the above-mentioned embodiment is realized.

In addition, a computer storage medium is further provided in an embodiment of the present application.

The computer storage medium stores a computer program, when the computer program is executed by a processor, the operation in the multi-terminal screen combination method provided by the above-mentioned embodiment is realized.

It should be noted that in this paper, relational terms such as first and second are only used to distinguish one entity/operation/object from another entity/operation/object, and do not necessarily require or imply any such actual relationship or order between these entities/operations/objects. The terms "including", "containing" or any other variation thereof are intended to cover non-exclusive inclusion, so that a process, method, object or system that includes a series of elements not only includes those elements, but also includes other elements not explicitly listed, or also includes elements inherent in such process, method, article, or system. Without more restrictions, the element defined by a sentence "including one . . . " does not exclude that there are other identical elements in the process, method, object, or system that includes this element.

As for the apparatus embodiment, it is basically similar to the method embodiment, so the description is relatively simple. Please refer to partial description of the method embodiment for details. The apparatus embodiments described above are only schematic, in which the units described as separate components may or may not be physically separated. Some or all of the modules can be selected according to the actual needs to achieve the objective of the application scheme. Those skilled in the art can understand and implement without paying creative labor.

Serial number of the embodiments of the present application is only for description and does not represent advantages and disadvantages of the embodiments.

Through the above description of the embodiments, those skilled in the art can clearly understand that the above embodiments can be implemented by means of software plus the necessary general hardware platform, of course, hardware, but in many cases the former is a better implementation. Based on this understanding, the technical solution of the present application in essence or the part that contributes to the prior art can be embodied in the form of a software product, which is stored in a computer storage medium (such as ROM/RAM, magnetic disc, optical disc) as described above, a plurality of instructions are included to enable a terminal device (which can be a mobile phone, a computer, a server, an air conditioner, or a network device, etc.) to execute the methods described in various embodiments of the present application.

The above-mentioned is only some preferred embodiments of the present application, and does not limit a patent scope of the present application. Any equivalent structure or flow transformation made by using contents of the description and drawings of the present application, directly/indirectly applied in other related technical fields, are included in the claimed scope of the present application.

What is claimed is:

1. A multi-terminal screen combination method, applied to a reference terminal, the multi-terminal screen combination method comprising steps of:
    obtaining a screen size of the reference terminal and a screen size of a target terminal;
    dividing a picture to be displayed, according to the screen size of the reference terminal and the screen size the target terminal, to generate a display sub-picture corresponding to the reference terminal and a display sub-picture corresponding to the target terminal;
    displaying the display sub-picture corresponding to the reference terminal, and sending the display sub-picture corresponding to the target terminal to the target terminal for display;
    upon receiving a display parameter adjustment instruction, adjusting a display parameter of the reference terminal based on the display parameter adjustment instruction, and forwarding the display parameter adjustment instruction to the target terminal, to enable the target terminal to perform display parameter adjustment based on the display parameter adjustment instruction synchronously with the reference terminal; and
    upon detecting that the target terminal has received the display parameter adjustment instruction, forwarding the display parameter adjustment instruction to another target terminal, to enable the another target terminal to perform display parameter adjustment based on the display parameter adjustment instruction synchronously with the target terminal.

2. The multi-terminal screen combination method of claim 1, wherein the step of obtaining the screen size of the reference terminal and the screen size of the target terminal comprises substeps of:
    detecting one or more candidate terminals in a network where the reference terminal is located;
    sending a test instruction to each of the one or more candidate terminals, and determining, as the target terminal, one of the one or more candidate terminals that returns confirmation information in response to the test instruction; and
    obtaining the screen size of the reference terminal and the screen size of the determined target terminal.

3. The multi-terminal screen combination method of claim 2, wherein the substep of sending the test instruction to each of the one or more candidate terminals, and determining, as the target terminal, one of the one or more candidate terminals that returns the confirmation information in response to the test instruction comprises:
    sending the test instruction to each candidate terminal of the one or more candidate terminals to enable the each candidate terminal to display a confirmation interface, and determining, as the target terminal, one of the one or more candidate terminals that returns the confirmation information after receiving a confirmation instruction input by a user via the confirmation interface.

4. The multi-terminal screen combination method of claim 1, wherein the step of dividing the picture to be displayed comprises substeps of:
    dividing the picture to be displayed, according to the screen size of the reference terminal and the screen size of the target terminal, to generate a sub-picture corresponding to the reference terminal and a sub-picture corresponding to the target terminal;

obtaining resolution of the reference terminal and resolution of the target terminal; and processing the sub-picture corresponding to the reference terminal, according to the resolution of the reference terminal, to generate the display sub-picture corresponding to the reference terminal, and processing the sub-picture corresponding to the target terminal, according to the resolution of the target terminal, to generate the display sub-picture corresponding to the target terminal.

5. The multi-terminal screen combination method of claim 4, wherein the substep of processing the sub-picture corresponding to the reference terminal, and processing the sub-picture corresponding to the target terminal comprises:

obtaining resolution of the sub-picture corresponding to the reference terminal and resolution of the sub-picture corresponding to the target terminal, and determining a relationship between the resolution of the sub-picture corresponding to the reference terminal and the resolution of the reference terminal and a relationship between the resolution of the sub-picture corresponding to the target terminal and the resolution of the target terminal;

interpolating the sub-picture corresponding to the reference terminal to generate the display sub-picture corresponding to the reference terminal if the resolution of the sub-picture corresponding to the reference terminal is less than the resolution of the reference terminal, and interpolating the sub-picture corresponding to the target terminal to generate the display sub-picture corresponding to the target terminal if the resolution of the sub-picture corresponding to the target terminal is less than the resolution of the target terminal;

compressing the sub-picture corresponding to the reference terminal to generate the display sub-picture corresponding to the reference terminal if the resolution of the sub-picture corresponding to the reference terminal is greater than the resolution of the reference terminal, and compressing the sub-picture corresponding to the target terminal to generate the display sub-picture corresponding to the target terminal if the resolution of the sub-picture corresponding to the target terminal is greater than the resolution of the target terminal; and taking the sub-picture corresponding to the reference terminal directly as the display sub-picture corresponding to the reference terminal if the resolution of the sub-picture corresponding to the reference terminal is equal to the resolution of the reference terminal, and taking the sub-picture corresponding to the target terminal directly as the display sub-picture corresponding to the target terminal if the resolution of the sub-picture corresponding to the target terminal is equal to the resolution of the target terminal.

6. The multi-terminal screen combination method of claim 4, wherein the substep of dividing the picture to be displayed to generate the sub-picture corresponding to the reference terminal and the sub-picture corresponding to the target terminal comprises:

determining whether the screen size of the reference terminal is same as the screen size of the target terminal; and equally dividing the picture to be displayed if the screen size of the reference terminal is same as the screen size of the target terminal, to generate the sub-picture corresponding to the reference terminal and the sub-picture corresponding to the target terminal.

7. The multi-terminal screen combination method of claim 1, further comprising: after displaying the display sub-picture corresponding to the reference terminal, and sending the display sub-picture corresponding to the target terminal to the target terminal for display, upon receiving a notification message or detecting that the target terminal has received the notification message, determining whether the notification message is a private message; and simplifying the notification message for display if the notification message is the private message.

8. A non-transitory computer storage medium storing thereon a computer program executable by a processor to perform the multi-terminal screen combination method of claim 1.

* * * * *